Feb. 8, 1966  F. STEINER  3,234,553
OMNI-DIRECTIONAL INSTRUMENT LANDING
SYSTEM, PARTICULARLY FOR VERTICAL
TAKE-OFF AND V/STOL AIRCRAFT
Filed March 5, 1963  2 Sheets-Sheet 1
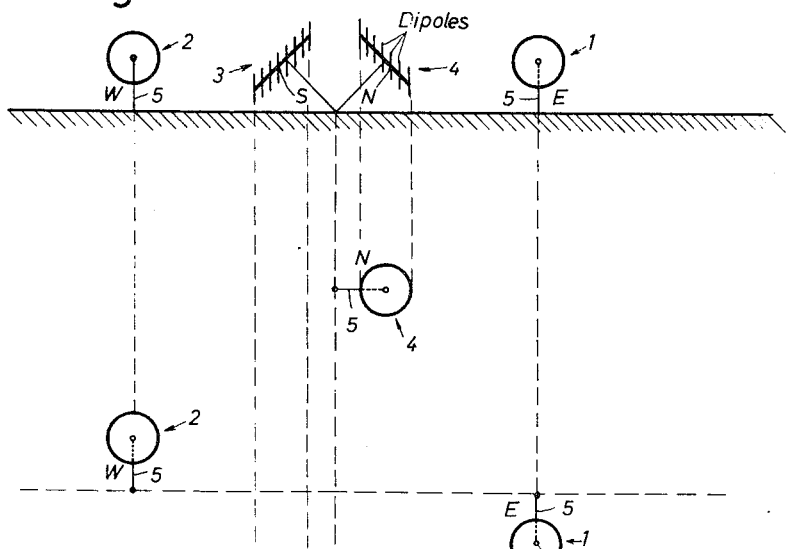
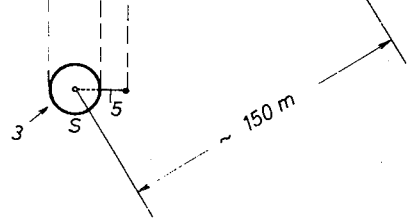
INVENTOR
FRITZ STEINER
BY
ATTORNEY Feb. 8, 1966 F. STEINER 3,234,553
OMNI-DIRECTIONAL INSTRUMENT LANDING
SYSTEM, PARTICULARY FOR VERTICAL
TAKE-OFF AND V/STOL AIRCRAFT
Filed March 5, 1963 2 Sheets-Sheet 2
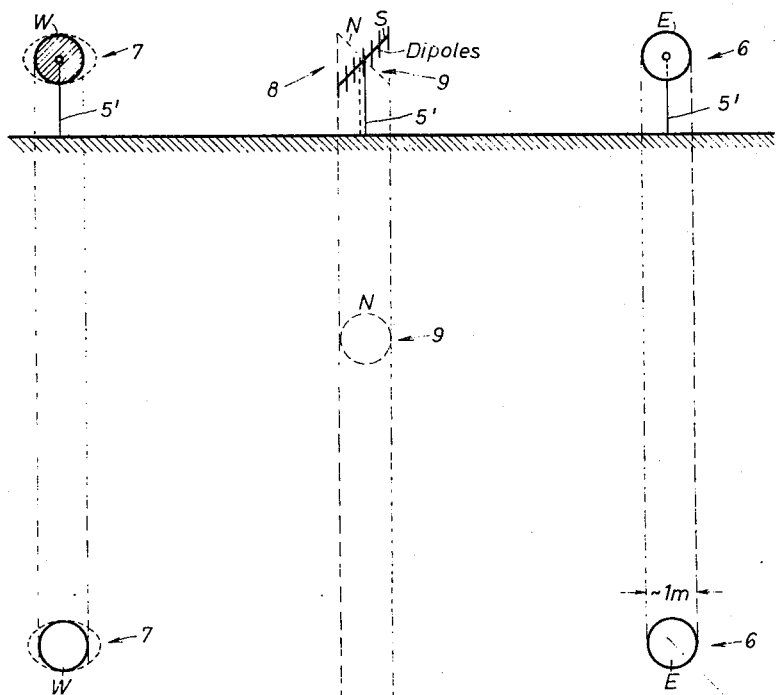
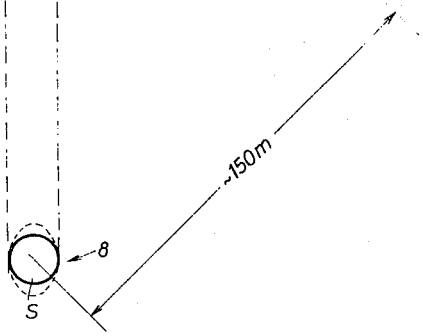
INVENTOR
*FRITZ STEINER*
BY
ATTORNEY

United States Patent Office 3,234,553
Patented Feb. 8, 1966

---

3,234,553
OMNI-DIRECTIONAL INSTRUMENT LANDING SYSTEM, PARTICULARLY FOR VERTICAL TAKE-OFF AND V/STOL AIRCRAFT
Fritz Steiner, Pforzheim, Germany, assignor to International Standard Electric Corporation, New York, N.Y., a corporation of Delaware
Filed Mar. 5, 1963, Ser. No. 262,913
Claims priority, application Germany, Mar. 10, 1962, St 18,951
9 Claims. (Cl. 343—108)

The conventional instrument or blind landing systems in which the approach from one single direction and with a very small descent angle (approximately 3°) is possible, are not suitable for vertical take-off and V/STOL (vertical and standard take-off and landing) aircraft, because for these aircrafts the approach from any arbitrary direction with descent angles to be selected by the pilot must be realized whereby the landing field is only 150 meters x 150 meters in size. The systems to be used by vertical take-off and V/STOL aircraft should also permit an altitude indication in the aircraft itself with an accuracy of approximately 1 meter, particularly near ground level. It is also permitted that the accuracy of measurements not only of the altitude but of all values may diminish only with the increasing altitude and with the increasing distance of the aircraft from the landing field, but it should be possible to measure the various navigational values at least in a hemisphere of about 10 km. from the center of the landing field.

Provided that the approach can be made from any direction selectable by the pilot the only means to determine the position of the aircraft is the intersecting point of at least three characteristic planar or spherical surfaces formed in space by radiations of radio beacons. Three ground stations (in practice four ground stations would be preferable as will be explained later) are provided, i.e. transmitters operating as radio beacons in the way known located at the corners of an equilateral triangle limiting the landing field.

By using conventional types of radio beacons three types of characteristic surfaces are possible to determine the position of an aircraft.

(1) Families of confocal hyperboloids of revolution wherein the focus is located at the corners of a triangle, particularly of an equilateral triangle. The hyperboloids are determined in a known way by the value of the transit time difference between the radiations of two radio beacons (hyperbolic air navigation). Since, however, the transit time difference of all three transmitters becomes zero at the perpendicular line erected at the intersection point of the median perpendiculars of the triangle, altitude measuring on this perpendicular is impossible. So this system cannot be used as a navigational aid for V/STOL aircraft.

(2) Surfaces of concentric hemispheres, the corner points of the triangle being the centers of the hemispheres. The position of an aircraft will be determined by the intersection of three hemispheric surfaces with the known method of measuring the distance, e.g. by means of transponders installed in the aircraft, by interrogating the aircraft from three ground-stations. The interrogations are evaluated by means of a ground-based computer the result being transmitted to the aircraft with methods known. This method, however, shows two disadvantages:

(a) The mutual intelligence transmission and the distance measuring which has to be performed with an extreme accuracy limit the capability of the system or necessitate very large band widths for the transmission ground-to-air and air-to-ground.

(b) The angle of the intersections of the hemisphere surfaces becomes flatter the closer ground is approached; that means that determination of the altitude at ground level, where it should be particularly exact, is actually *very* inexact. So this method too, is unsuitable for vertical take-off and V/STOL aircraft.

(3) Families of planes, the common intersecting straight line of which coincides with the axes of the three omni-directional radio beacons located at the corner points of the triangle.

In this system the position of an aircraft will be determined by the intersection of three planes ($\theta$ planes), if the omni-directional radio beacons are set up in such a way according to the invention that their axes are not in parallel. If the axes of the omni-directional radio beacons are parallel, according to the customary installation, identical intersecting lines but no intersecting points are formed between three $\theta$-planes. Generally speaking such $\theta$-planes are produced usually by omni-directional radio-beacons (e.g. Doppler-omni-range radio beacons). In a conventional or Doppler VOR system the azimuth $\theta$ of a moving body may be measured according to its direction to the beacon antenna regardless of the altitude of the moving body and regardless of the distance from the beacon. Therefore, constant values of $\theta$ are measured in vertical planes extending radially from the center of the antenna system, the vertical axis of the antenna system being the intersecting straight line of the plurality of planes. If the axis of the antenna system is rather skew than vertical, or in other words, inclined with respect to the vertical at a predetermined angle, likewise planes of constant $\theta$ values inclined with respect to the vertical are obtained, for the sake of abbreviation referred to in the specification as "$\theta$ planes." A family of planes is set up in space running through the axis of the omni-range radio beacon and the individual planes can be determined by measuring the phase angle of the bearing voltage with respect to the phase of a reference voltage.

If, for example, one of the already proposed wide-base navigation systems, e.g. the Doppler-wide-base omni-range radio beacon will be used very accurate angles (of about 1°) are obtained, except for a small zone with unusable exactness within a cone around the axis of the omni-range radio beacon with an angle of apertures of only a few degrees.

According to the invention at least three, preferably four, omni-range beacons are installed at the corners of a preferably regular geometrical figure (equilateral triangle, square, etc.) the axes of which are arranged in skew relation to one another, so that they are neither intersecting each other nor run in parallel. In order to obtain an exactly defined intersection between three planes in any case, if an aircraft is approximately or exactly in the extension of the axis of one of the omni-range radio beacons it is suitable to use four omni-range radio beacons.

The invention will be better understood from the following more detailed description taken in conjunction with the accompanying drawings, in which:

FIG. 1 represents schematically a side view of the whole beacon system as viewed from the South;

FIG. 2 is a plan view of the system of FIG. 1;

FIG. 3 is a side view of a circular embodiment of the antenna system; and

FIG. 4 is a plan view of the antenna system of FIG. 3.

FIGS. 1 and 2 schematically show as an example a favorable arrangement where the antenna systems of four Doppler-omni-range radio beacons are located at the corners of a square and where the axes are inclined by 45° with respect to the horizontal plane always in another cardinal point.

The antenna systems of the omni-range radio beacons will suitably be mounted at the corners of a square directed towards the four cardinal points East, West, South, North and represented by the numerals 1–4, inclusive. The antenna planes or the axes of the antenna systems respectively are inclined towards the horizontal or the vertical respectively by 45°. That means the axis of the east-antenna system is inclined by 45° towards the South, the south-antenna system by 45° towards the West, the west-antenna system by 45° towards the North, and the north-antenna system by 45° towards the East. The heavy lines 5 leading out from the center of the circles 1–4, inclusive, symbolize the supporting structure of the antenna system. The symbols S and N in FIG. 1, like in FIG. 2 refer to the whole antenna systems, the South antenna system or the North antenna system respectively.

In a preferred embodiment of the invention the antenna systems 1–4, inclusive, will be elliptical in shape as compared with the Doppler-omni-range radio beacons with circular antenna systems, the antenna planes having an inclination of 45° with respect to the horizontal plane, the main axis ratio of the ellipse being $\sqrt{2}/1$. Each antenna system, seen from a point of a perpendicular line erected in the center of the antenna plane, appears therefore as a circle. The elliptical antenna systems also appear as circles, if they are seen horizontally from that direction to which their respective axes are inclined. In the preferred embodiment shown the antenna systems are substantially of elliptical shape but inclined, as disclosed in the specification, by 45° with respect to the vertical (or the horizontal), each one to a different direction (N-E-S-W), so that seen from the top (FIG. 2), all four antenna systems are seen as circles, where as seen from the South in a horizontal plane (FIG. 1) the West and the East antenna systems due to their inclination are seen as circles, the South and the North antenna system being seen as straight lines. Each antenna system comprises a plurality of radiating elements such as vertical dipoles arranged at the circumference of the ellipse at a predetermined spacing, the dipoles being successively and cyclically fed with RF energy to provide a Doppler-type omni-directional beacon system. Certain simplifications are obtained by evaluating the navigational data in such elliptical antenna systems. Due to the inclination of the axes of the antenna systems flat intersections between two $\theta$-planes never occur in the vicinity of omni-range radio beacons; only at long distances these intersecting angles become approximately 180°.

With reference to FIGS. 3 and 4, there are shown the circular embodiments of the antenna systems, the radio beacons 6–9, inclusive, being inclined in the same manner as described above for the elliptical beacons.

It can be shown that a very exact determination of altitude and glide angle is possible in space within a hemisphere which encircles the four omni-range radio beacons. By such a system an accuracy of 1° is easily to be achieved, with regard to the glide angle and the altitude to an accuracy of about 1.3 meters at a lateral length of about 150 meters of the square defined by the radio beacons. The azimuth is measured with an accuracy of 1°, even outside the hemisphere up to the range determined by the field strength of the radio beacons. The accuracy of altitude and glide angle measuring or the distance measuring respectively decreases with distance outside the hemisphere. However, to approach a landing field from a long distance knowledge of the direction (of the azimuth) only is sufficient, the other values (altitude, distance) need not to be determined before getting closer to the landing field.

Since on board an aircraft at first only the four azimuth-angles are determined (although only three are necessary), i.e. the angles of the $\theta$-planes of the four omni-directional radio beacons compared with a reference direction, a coordinate converter must be provided aboard the aircraft by which the position of the aircraft in space can be determined in a suitable system of coordinates, e.g. in Cartesian-, spherical or cylindrical coordinates.

The omni-range radio beacons shall favorably be designed as wide-base Doppler omni-directional radio beacons with circular or elliptical antenna systems on which the motion of one or several individual antennae fed with RF-energy will be realized or simulated, whereby the fictitious gyration rate can be the same for all four radio beacons and where a reference frequency, common to all four beacons, will be radiated. The radio beacons may be operated either in the time multiplex mode or in the frequency-multiplex mode so that a single carrier frequency only will be radiated for all four radio beacons and the "rotating" antennae of each omni-directional radio beacon are fed with different frequencies. To keep the antenna systems small in size despite the large $D/\lambda$ ratio necessary the radio beacons will favorably be operated in the UHF- or X-band.

While I have described above the principles of my invention in connection with specific apparatus, it is to be clearly understood that this description is made only by way of example and not as a limitation to the scope of my invention as set forth in the objects thereof and in the accompanying claims.

I claim:
1. An omni-directional radio range instrument landing system for vertical take-off and V/STOL aircraft, having a plurality of omni-directional range radio beacons by which a family of $\theta$-planes is defined passing through the axis of the omni-directional range radio beacon as the common intersecting straight line, each said $\theta$ plane being a vertical plane which extends radially from the axis of the antenna system, along which plane the azimuth of the aircraft may be measured comprising at least three radio beacons, the antenna systems of said radio beacons being positioned at the corners of a geometrical figure so that the axis of the antenna system of each said radio beacon forms an angle different from 90° with respect to the horizontal plane so that the direction of the inclination of the axes with respect to the horizontal plane varies for the individual antenna systems.

2. An omni-directional radio range instrument landing system, according to claim 1, comprising at least four radio beacons, each said radio beacon being positioned at the corner of a square according to the carrdinal points of the compass and the axis of the north-antenna having an inclination either to the East or to the West and the inclination of the axes of the other antennas being directed clockwise.

3. An omni-directional radio range instrument landing system according to claim 1, wherein the omni-directional range radio beacons are of the Doppler type and each antenna system comprises dipole antennas, said dipole antennas being successively and cyclically fed with radio frequency energy.

4. An omni-directional radio range instrument landing system according to claim 3, wherein the antenna system of each said radio beacon is circular.

5. An omni-directional radio range instrument landing system, according to claim 3, wherein the antenna system of each said radio beacon is elliptical.

6. An omni-directional radio range instrument landing system according to claim 5, characterized in this, that the main axis ratio of the ellipse is $\sqrt{2}:1$.

7. An omni-directional radio range instrument landing system according to claim 3, wherein a common reference frequency is radiated for all omni-range radio beacons.

8. An omni-directional radio range instrument landing system according to claim 3, wherein a common carrier frequency for all said radio beacons is radiated from a fixed antenna in each said radio beacon and the differential frequency to feed the individual antennae of each said radio beacon for producing the Doppler-effect is different for each said omni-range radio beacon.

9. An omni-directional radio range instrument landing system according to claim 1, wherein the axis of each said radio beacon is inclined 45° to the horizontal plane.

No references cited.

CHESTER L. JUSTUS, *Primary Examiner.*
KATHLEEN CLAFFY, *Examiner.*